(12) United States Patent  (10) Patent No.: US 7,330,618 B2
Doerr  (45) Date of Patent: Feb. 12, 2008

(54) WAVEGUIDE STRUCTURE

(75) Inventor: Christopher R Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 45 days.

(21) Appl. No.: 11/164,638

(22) Filed: Nov. 30, 2005

(65) Prior Publication Data

US 2007/0122081 A1  May 31, 2007

(51) Int. Cl.
*G02B 6/34* (2006.01)
*G02B 6/26* (2006.01)
*G02B 6/42* (2006.01)

(52) U.S. Cl. .................. 385/37; 385/31; 385/39; 385/46; 385/50

(58) Field of Classification Search .............. 385/37
See application file for complete search history.

(56) References Cited

U.S. PATENT DOCUMENTS

| | | | | |
|---|---|---|---|---|
| 5,889,906 A | * | 3/1999 | Chen | 385/28 |
| 6,266,464 B1 | * | 7/2001 | Day et al. | 385/37 |
| 6,374,013 B1 | * | 4/2002 | Whiteaway et al. | 385/37 |
| 6,678,446 B1 | * | 1/2004 | McGreer et al. | 385/37 |

FOREIGN PATENT DOCUMENTS

JP  2000329954 A  * 11/2000

* cited by examiner

*Primary Examiner*—Frank G. Font
*Assistant Examiner*—Ryan Lepisto

(57) ABSTRACT

An improved waveguide structure employing blocks of waveguide core material positioned sufficiently close to a waveguide core thereby eliminating strain effects and its resulting undesirable polarization crosstalk. The improved structures are applicable to a variety of optical components including bent waveguides, directional and star couplers.

2 Claims, 6 Drawing Sheets

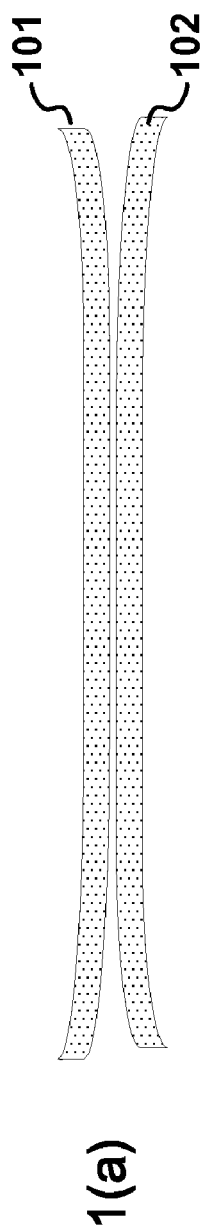
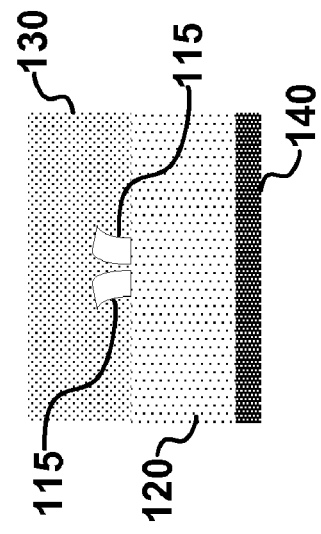
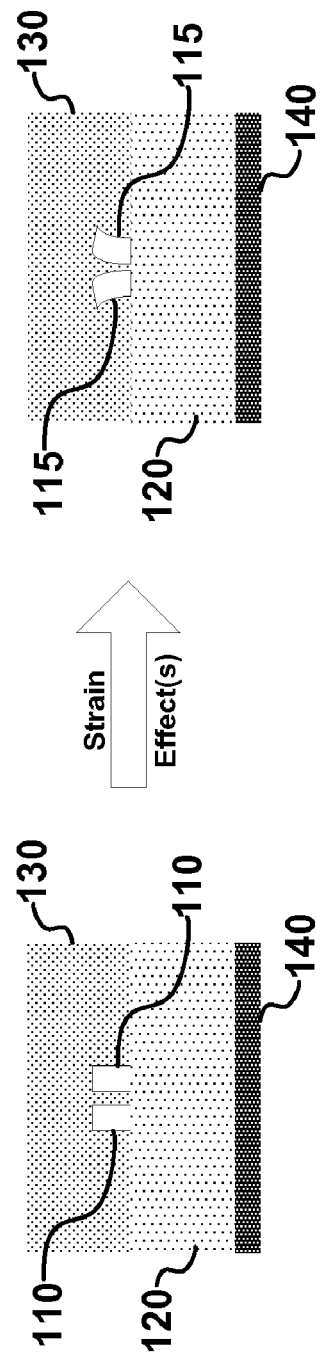
FIG. 1 (Prior Art)

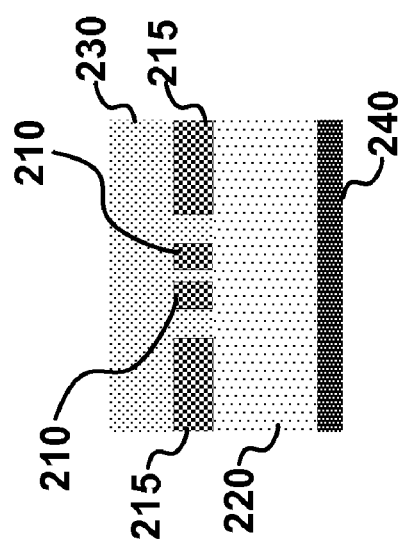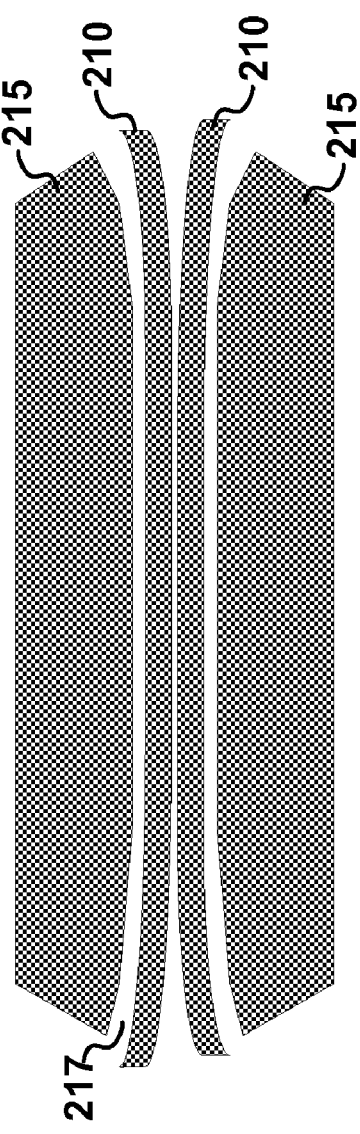
2(a)
2(b)
Directional
Coupler
FIG. 2

WAVEGUIDE STRUCTURE

FIELD OF THE INVENTION

This invention relates generally to the field optical communications and in particular to waveguide design(s) that reduce stress-induced polarization crosstalk.

BACKGROUND OF THE INVENTION

Silica waveguide, Planar Lightwave Circuits (PLCs) ideally exhibit polarization modes that are independent from one another. However, certain lightwave components such as directional couplers, exhibit polarization crosstalk—a phenomenon in which the polarization modes are coupled. Unfortunately, such polarization crosstalk and polarization mode coupling defeats many of the techniques that are used to achieve polarization independence—a necessary characteristic of many optical devices.

SUMMARY OF THE INVENTION

I have developed, in accordance with the principles of the invention, optical waveguide structures that exhibit improved polarization crosstalk characteristics. More specifically, my inventive structures employ additional waveguide core material—placed in close proximity to a waveguide core—that eliminates strain effects which produce the undesirable polarization crosstalk.

Advantageously, my inventive principles may be employed in a variety of optical components that include optical waveguides, i.e., directional couplers, bent waveguides, and star couplers. When applied to directional optical couplers and bent waveguides, the additional waveguide core material comprises "blocks" of waveguide core material. When applied to star couplers, the additional waveguide core material comprises a number of "dummy" waveguides, spaced around any active waveguides.

BRIEF DESCRIPTION OF THE DRAWING

A more complete understanding of the present invention may be realized by reference to the accompanying drawing in which:

FIG. 1 shows (a) top-view and (b) cross-sectional view of a directional coupler showing the effects of strain;

FIG. 2 shows (a) cross-sectional view and (b) top-view of a directional coupler constructed according to the teachings of the present invention;

DETAILED DESCRIPTION

Figure 3:
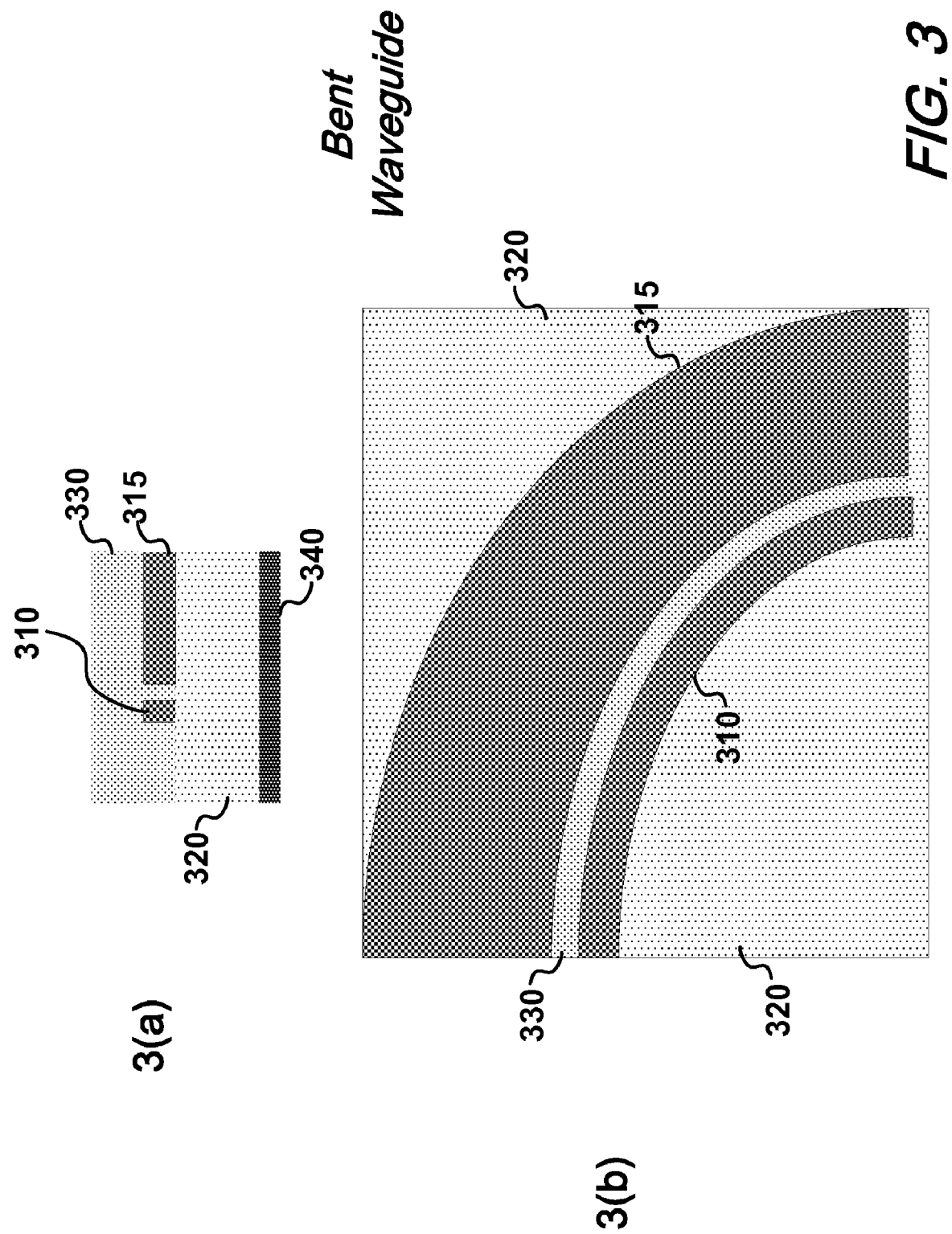
FIG. 3 shows (a) cross-sectional view and (b) top-view of a bent waveguide constructed according to the teachings of the present invention.

FIG. 1 shows a top-view and cross-sectional view(s) of a directional coupler and the effect(s) of strain on that coupler. More particularly, FIG. 1(a) shows a top-view of the directional coupler having multiple waveguide cores 101, 102. FIG. 1(b) shows a cross-sectional view of that same coupler without strain effects while FIG. 1(c) shows that same coupler with strain effects.

With initial reference to FIG. 1(b), there is shown the cross-sectional view of a directional coupler including a substrate 140 underlying a lower cladding material 120. Positioned on the lower cladding material 120 are waveguide cores 110. Overlying the waveguide cores 110 and lower cladding 120 is upper cladding material 130. As can be appreciated, the refractive indices of the waveguide cores 110, the lower cladding material 120, and upper cladding material 120, are chosen such that a desired internal reflection of optical signals traversing the waveguide cores 110 is achieved.

When optical waveguides are brought in close proximity with one another—as in FIG. 1(a)—an asymmetric strain is established resulting in distorted or otherwise asymmetric waveguide cores 115 such as those shown in FIG. 1(c). Although the bending of the waveguide cores 115 depicted in that FIG. 1(c) is somewhat exaggerated, there nevertheless is suitable stress induced to produce an undesirable asymmetry.

Generally, such stress and resulting waveguide asymmetries originate from differences in thermal expansion coefficients between the waveguide cores 115, the lower cladding material 120, and the upper cladding material 130. As a result, and during the manufacture of such waveguide structures, an upper portion of the waveguide cores 115 tends to "flare" as the structure is cooled. This "flaring"—in the case of a directional coupler —causes the birefringence axis of the waveguide core 115 to be non-perpendicular to the substrate 140.

Consequently, in a directional coupler like that shown in FIG. 1(a), TE-polarized light entering one of the waveguides will couple to both TE and TM polarizations in the other waveguide. This polarization crosstalk renders devices constructed from such directional couplers, i.e., a Mach-Zehnder Interferometer, to be polarization sensitive.

According to the present invention, one way to eliminate or substantially reduce such strain effects in waveguide structures is to position relatively large "blocks" of waveguide core material sufficiently close to a waveguide core—without negatively affecting its optical properties—such that strain effects and resulting asymmetries are reduced or eliminated. FIG. 2 depicts such structures.

More specifically, the blocks 215 of waveguide material are placed as close as possible to waveguides 210 without allowing significant light to couple from the waveguides 210 into the blocks 215. Additionally, the blocks 215 are made significantly wider than the waveguides 210, i.e., >1.1× as wide, or more. Lastly, at the ends of the coupler shown in this FIG. 2, the blocks preferably diverge thereby increasing the distance from the blocks 215 to the waveguides 210.

With reference now to FIG. 2, there is shown a cross-sectional (2(a)) and a top-view (2(b)) of a directional coupler constructed according to my inventive teachings. Shown in FIG. 2(a) is a structure including a substrate 240 overlying which is a lower cladding material 220. Positioned on the lower cladding material 220 are waveguide cores 210.

Also situated on the lower cladding material 220 and nearby waveguide cores 210 are "blocks" of waveguide material 215 which are preferably constructed from the same material as the waveguide cores 210. The blocks 215 are positioned sufficiently close to the waveguide cores 210 to limit the strain effects—without negatively affecting the optical properties of the waveguide cores 210.

Overlying the waveguide cores 210, blocks of waveguide material 215, and lower cladding 220 is upper cladding material 230. As noted before, the refractive indices of the waveguide cores 210, the lower cladding material 220, and upper cladding material 220, are chosen such that a desired internal reflection of optical signals traversing the waveguide cores 210 is achieved.

FIG. 2(b) is a top-view of the structure(s) depicted in FIG. 2(a). Of particular interest with reference to that FIG. 2(b), are the relatively thick blocks of waveguide material 215 which are positioned in close proximity to waveguide cores 210—separated by the thin region of upper cladding material 217. Due in part to the presence of these relatively thick blocks of waveguide material 215, strain effects and resulting asymmetries in waveguide cores 210 are reduced substantially or eliminated.

Turning now to FIG. 3, there it is shown how the present invention may be applied to other waveguide structures. In particular, FIG. 3(a) is a cross-sectional view and FIG. 3(b) is a top-view of a bent waveguide structure employing my inventive teachings.

With reference to the cross-sectional view depicted in FIG. 3(a), the general waveguide structure including substrate 340, lower cladding material 320, upper cladding material 330, and waveguide core 310 is now a familiar one. However since the structure depicted in this FIG. 3 is a bent waveguide, it includes only a single waveguide core 310 and a single block of waveguide material 315 positioned in close proximity to that core.

Turning now to the top-view depicted in FIG. 3(b), on can quickly gain an appreciation for the difference in width of the block waveguide material 315 as compared to the waveguide core 310, both of which overlie a common lower cladding material 320 so that they substantially lie in the same horizontal plane. As noted before, the block waveguide material 315 is substantially wider than the waveguide core 310, i.e., >1.1× the width. In a preferred embodiment, the core may exhibit a width at least 1.5×-2.0× times that of the block, or greater.

It is now noted that such strain effects are not limited to the directional couplers or bent waveguides already discussed. Transmissive star couplers—a critical component in a plethora of optical apparatus—suffer from the same undesirable strain effects which are advantageously overcome through my inventive teachings.

Figure 4:
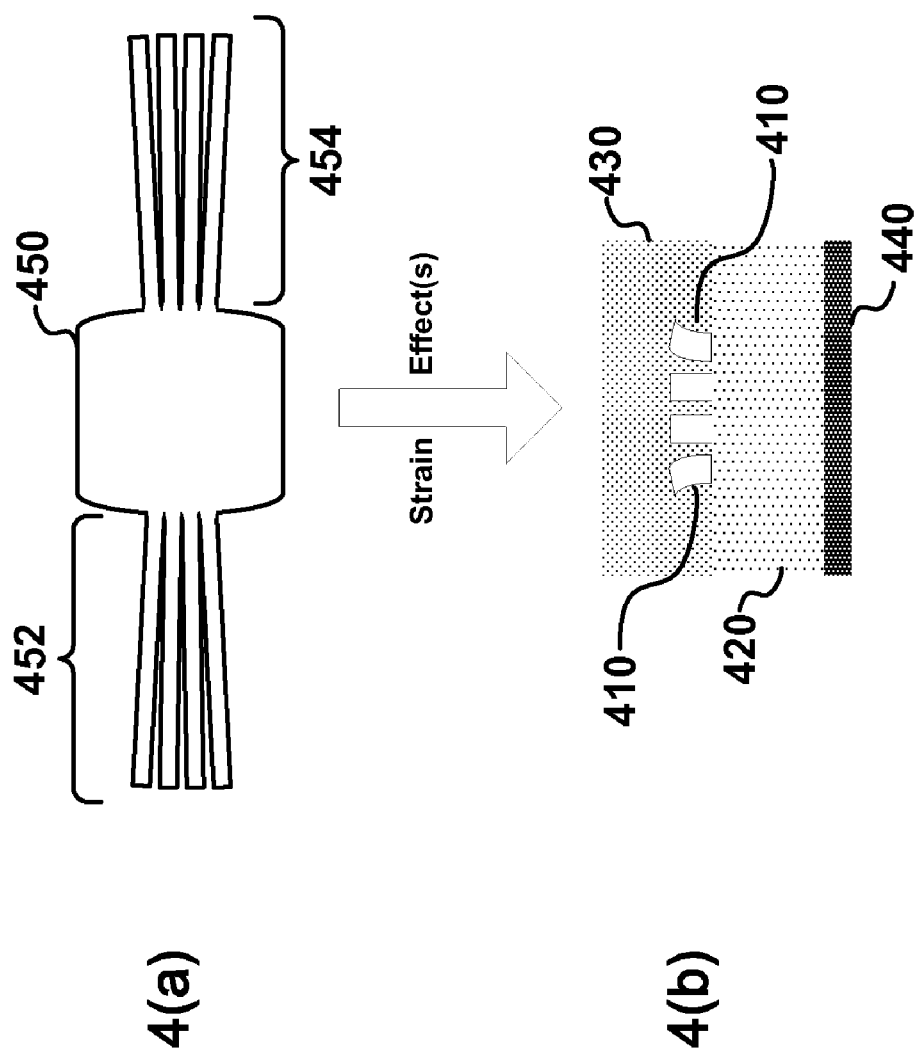
FIG. 4 shows (a) top-view and (b) cross-sectional view of a transmissive star coupler showing the effects of strain.

More specifically, and with reference now to FIG. 4, there is shown a simplified schematic of a star coupler and the effects of strain on its structure. As can be observed in FIG. 4(a), star couplers include a plurality of input waveguides 452, a plurality of output waveguides 454, and a slab-waveguide optical free-space region 450 connecting, and providing optical communication between the input waveguides 452 and the output waveguides 454.

Similar to the directional coupler and bent waveguide described earlier, when a transmissive star coupler such as that depicted in FIG. 4 is manufactured, strain effects result in waveguide "flaring" and resultant asymmetries. These asymmetries are shown in the cross-sectional view of the star coupler depicted in FIG. 4(b). In particular, the waveguide structure includes a substrate 440, a lower cladding material 420, an upper cladding material 430, and waveguide cores 410, wherein the outermost waveguide cores 410 are shown exhibiting asymmetries, which produce the highly undesirable polarization crosstalk phenomenon.

Figure 5:
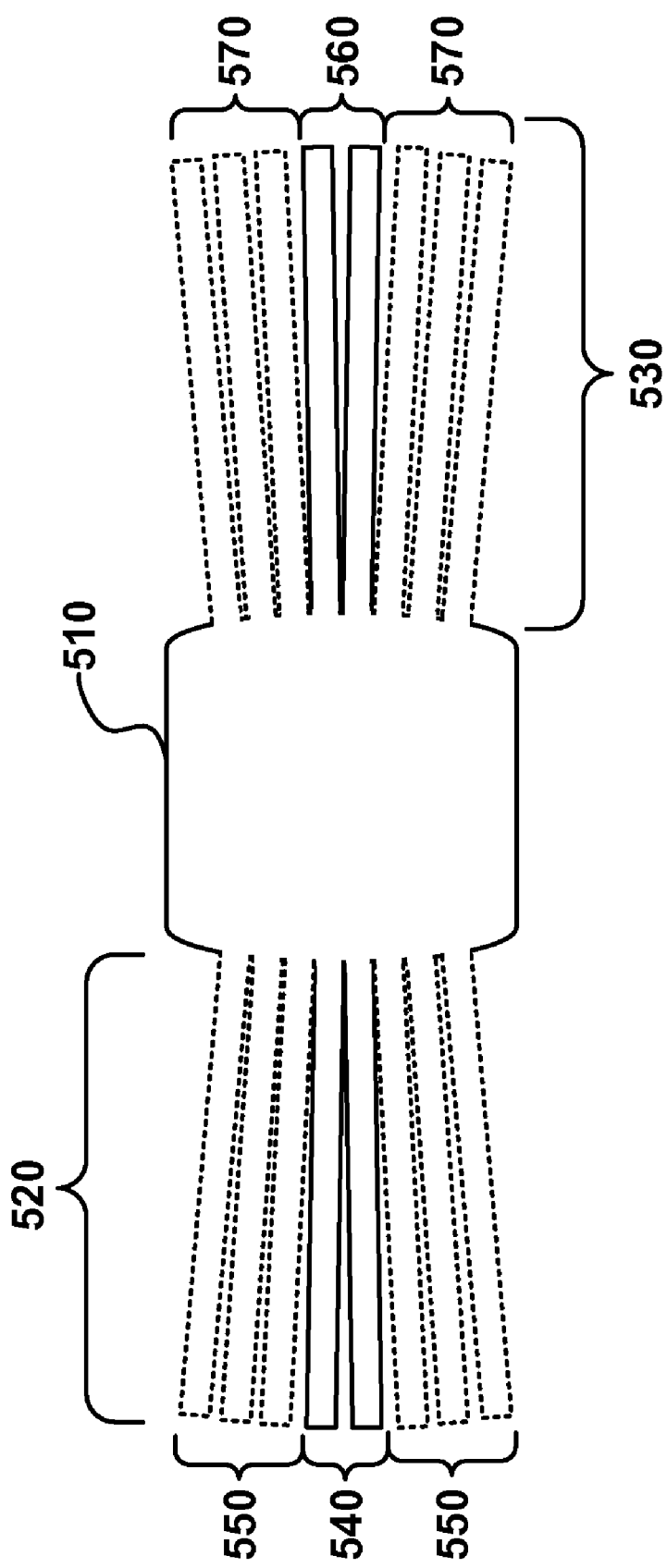
FIG. 5 shows top-view of a transmissive star coupler constructed according to the teachings of the present invention.

A top-view of a star coupler constructed according to the present invention is shown in FIG. 5. With reference to that FIG. 5, there is shown a star coupler having a plurality of input waveguides 520 and a plurality of output waveguides 530 optically coupled by a slab waveguide free-space region 510. According to my inventive teachings however, input and output waveguides which are used for optical transport are supported by a number of "dummy" waveguides, thereby relieving the strain effects.

In particular, the plurality of input waveguides 520, include a number of active waveguides 540, which in turn are surrounded by a number of "dummy" input waveguides 550. Similarly, the plurality of output waveguides 530 include a number of active output waveguides 560, which likewise are surrounded by a number of "dummy" output waveguides 570.

By surrounding the active input waveguides 540 and active output waveguides 560 with a number of dummy waveguides, the strain effects described previously are minimized and, in this case, a highly useful 2×2 optical coupler is constructed that does not suffer from polarization crosstalk.

The "dummy" waveguides 550, 570 may be viewed as extra, unused waveguides for construction purposes. As a result, the construction of such a device does not pose any substantially different manufacturing process/technique than those employed in constructing the slab waveguide 510 and active input and active output waveguides 540, and 560. In addition, the actual number of dummy waveguides is a matter of design and construction convenience, as this actual number need only be sufficient to impart the desired strain relief to active waveguides 540, 560.

Preferably, and for the purposes of my invention, the active waveguides, dummy waveguides, and slab waveguide may be constructed by a variety of known optical processing techniques. Finally, while I have shown my inventive star coupler to include two active input waveguides and two active output waveguides, the actual number(s) of each may vary, as dictated by the intended application.

Figure 6:
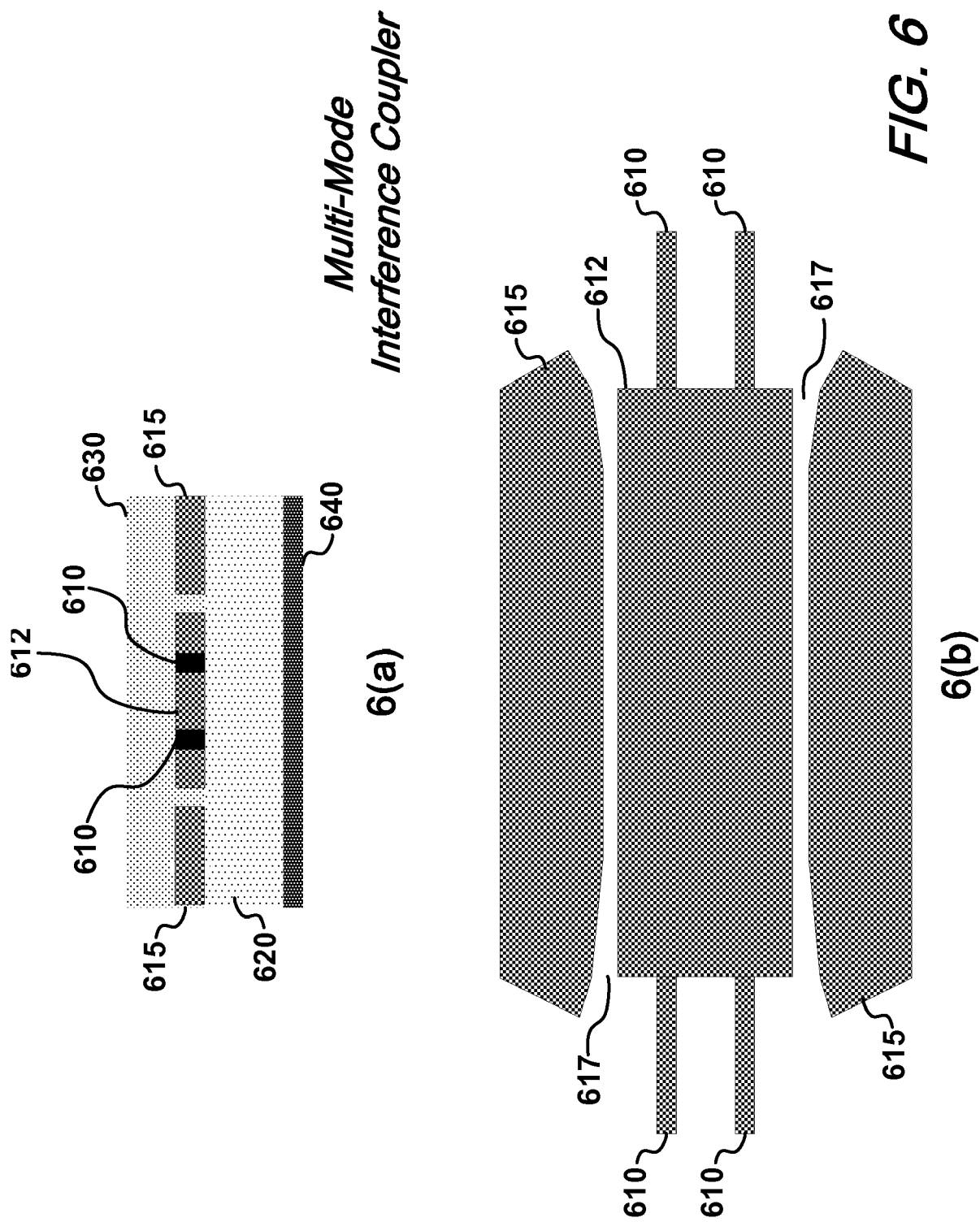
FIG. 6 shows (a) cross-sectional view and (b) top-view of a multi-mode interference coupler (MMI) constructed according to the teachings of the present invention.

FIG. 6 depicts yet another application of my inventive structures, namely a multi-mode interference coupler (MMI). With reference to that FIG. 6, FIG. 6(a) depicts a cross-sectional view and FIG. 6(b) depicts a top-view of such an MMI. In particular, the cross-sectional view of the MMI coupler depicted in FIG. 6(a) includes a substrate 640, a lower cladding material 620, an upper cladding material 630, and a slab waveguide 612, in addition to a number of input and output waveguides 610.

As can be seen from FIG. 6(b), the MMI includes a slab waveguide 612 which includes a number of input and output waveguides 610. When constructed according to my inventive teachings, such an MMI also includes a number of blocks 615 positioned in close proximity to the MMI, and separated by a gap 617.

As was the case earlier, the blocks 615 are positioned as close as possible to the MMI slab 612, such that no significant optical coupling between the slab 612 and the block(s) 615 results. In addition, ends of the slab(s) 615 gently taper away from the slab 612.

At this point, while I have discussed and described my invention using some specific examples, those skilled in the art will recognize that my teachings are not so limited. Accordingly, my invention should be only limited by the scope of the claims attached hereto.

What is claimed is:

1. An optical apparatus comprising:
a slab waveguide in optical communication with;
a plurality of input waveguides; and
a plurality of output waveguides;

CHARACTERIZED IN THAT:

the plurality of input waveguides connected to a first end of the slab waveguide includes a number of active input waveguides and a number of dummy input waveguides; and the plurality of output waveguides connected to an opposing second end of the slab waveguide includes a number of active output waveguides and a number of dummy output waveguides; and a number of distinct optical paths exist between the active input waveguides and the active output waveguides; and wherein the total number of input waveguides is at least three times the number of active input waveguides; and wherein the dummy input and dummy output waveguides surround the active input and active output waveguides respectively and are not interposed between the active input and active output waveguides respectively, such that the presence of the dummy waveguides significantly reduce strain effects within the active input and output waveguides.

2. An optical apparatus comprising:
a slab waveguide in optical communication with;
a plurality of input waveguides; and
a plurality of output waveguides;

CHARACTERIZED IN THAT:

the plurality of input waveguides connected to a first end of the slab waveguide includes a number of active input waveguides and a number of dummy input waveguides; and the plurality of output waveguides connected to an opposing second end of the slab waveguide includes a number of active output waveguides and a number of dummy output waveguides; and a number of distinct optical paths exist between the active input waveguides and the active output waveguides; and wherein the total number of output waveguides is at least three times the number of active output waveguides; and wherein the dummy input and dummy output waveguides surround the active input and active output waveguides respectively and are not interposed between the active input and active output waveguides respectively, such that the presence of the dummy waveguides significantly reduce strain effects within the active input and output waveguides.

* * * * *